United States Patent Office 3,330,565
Patented July 11, 1967

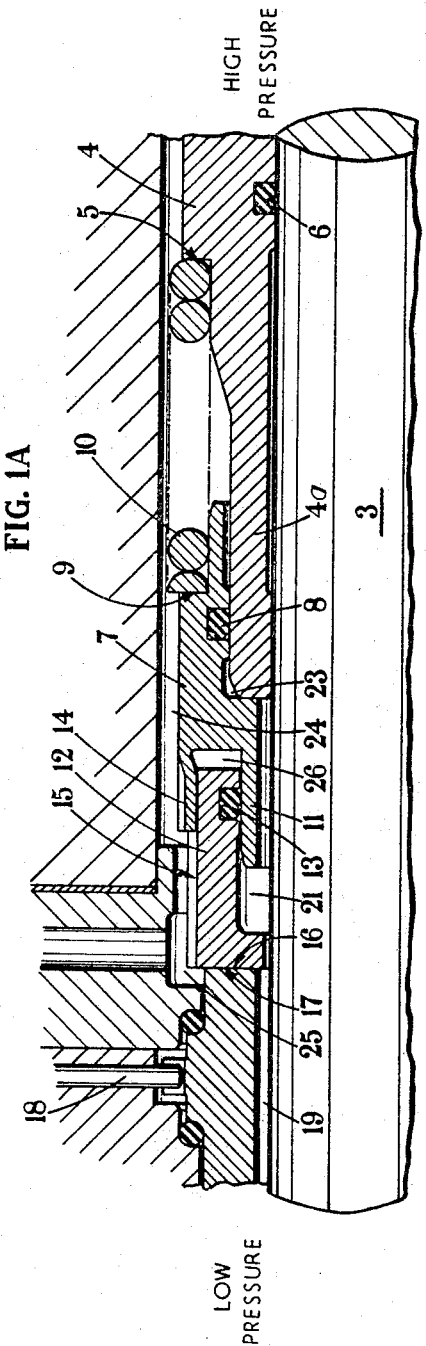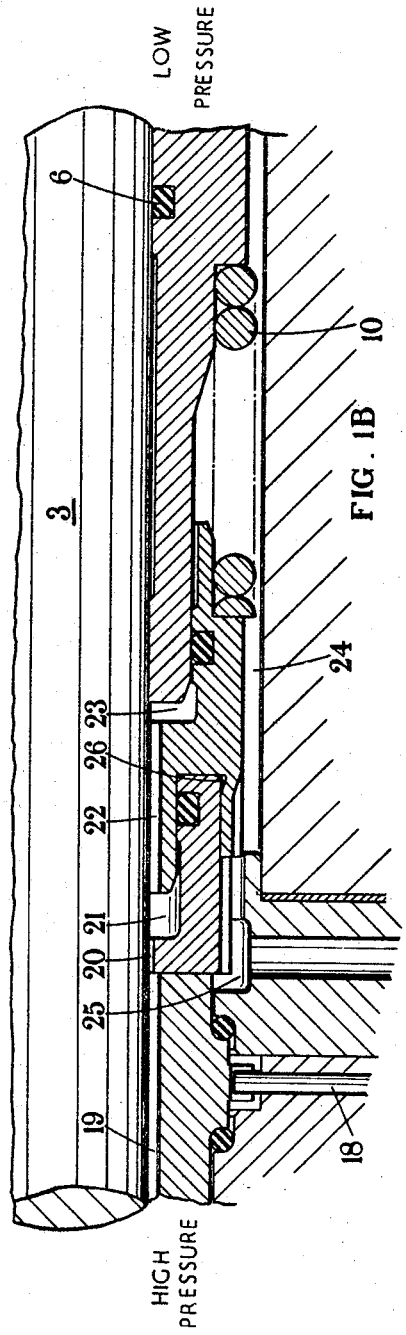

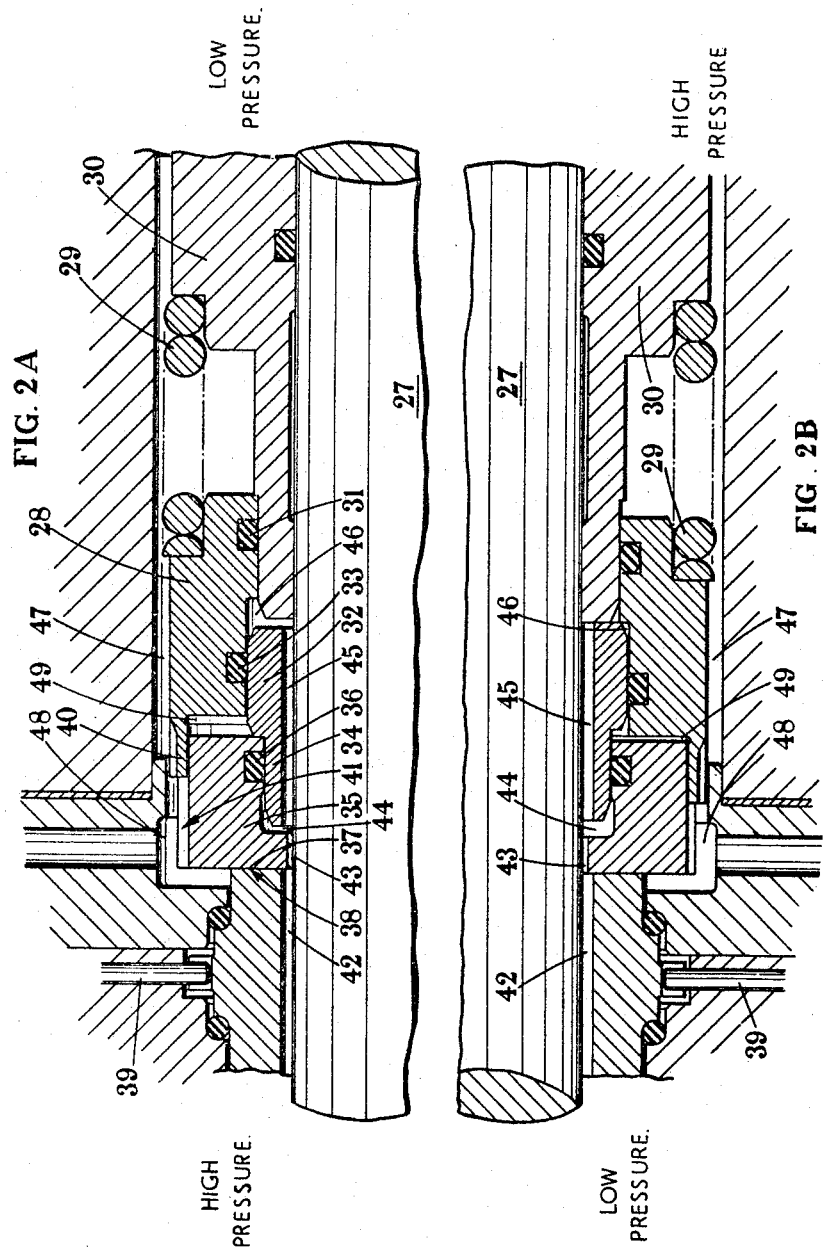

3,330,565
MECHANICAL SEALS FOR ROTATING SHAFTS
Arthur Lymer, Hale, Altrincham, England, assignor to Flexibox Limited, Manchester, England, a British company
Filed Oct. 28, 1963, Ser. No. 319,181
Claims priority, application Great Britain, Nov. 13, 1962, 34,947/62
2 Claims. (Cl. 277—91)

This invention relates to mechanical seals for a rotating shaft.

Where mechanical seals are used on rotating shafts the closure of the sealing faces of the seal is usually ensured by some spring means urging the faces into contact. When sealing a liquid near its boiling point the heat generated by the thrust at the seal rubbing faces may be sufficient to vaporise the liquid film there and give rise to most undesirable "dry running." This generated heat may be reduced sufficiently to prevent vaporisation of the liquid film by reducing the contribution of the spring to the thrust at the seal faces. It is, however, desirable to have enough spring thrust present when the product pressure is low to overcome the drag of the sliding seal members in order to maintain the seal faces in contact.

An object of the present invention is to enable the faces of a mechanical seal to be urged into contact with the maximum thrust available from a particular spring means when the pressure difference over the seal faces is zero and to progressively decrease this thrust to zero automatically by increase of the pressure difference to some designed value, above which the spring means makes no contribution to the thrust at the seal faces.

According to the present invention there is provided a mechanical seal for a rotating shaft comprising a unit having a spring loaded sliding seal member mounted circumferentially on the shaft and an associated co-axial piston, a seal face sliding member angularly fixed relative to the sliding seal member, a rotationally and axially fixed seal face into sealing contact with which said seal face sliding member is adapted to be urged, at least two circumferential sliding surfaces on said unit, the diameters of said sliding surfaces differing from each other and lying within the internal and external diameters of the contacting seal faces, and passages in and around said unit and seal face sliding member whereby the spring loading is automatically relieved in proportion to the pressure differential which exists over the seal faces in at least one direction of the pressure differential.

The intermediate piston can be integral with the sliding seal member or form a separate element. The term piston includes the concept of two opposed surfaces one on each of two relatively slidable elements where pressure between the faces will tend to slide the elements apart.

Embodiments of the invention will now be described, by way of example, with reference to the accompanying drawings in which:

FIGURES 1A and 1B show a vertical sectional view of one form of mechanical seal which is a balanced seal for pressure differential in either direction and having spring relief only when higher pressure is on the spring side. FIGURE 1A shows the disposition of the seal components when high pressure is on the spring side and FIGURE 1B shows their disposition with low pressure on the spring side.

FIGURES 2A and 2B show similar vertical sectional views of a second form of mechanical seal which is a balanced seal having spring relief for pressure differentials in either direction.

Referring to FIGURES 1A and 1B, a mechanical seal for a rotatable shaft 3 comprises an axially fixed element 4 surrounding the shaft 3, the element 4 having an annular shoulder 5 and a portion 4a of reduced diameter. The mounting of the fixed element 4 on the shaft 3 is rendered gas-tight by a resilient O-ring 6. A sliding seal member ring element 7 is slidably mounted on the reduced portion 4a of the fixed element 4 and is provided with a gas-tight O-ring 8. The sliding seal member 7 is formed with an annular shoulder 9 and between the shoulder 9 and the shoulder 5 on the fixed element 4 extends a coil spring 10.

Integral with the sliding seal member 7 is an intermediate annular piston 11 on which a seal face sliding member consisting of ring elements 12 is mounted for axial movement relative thereto. A gas-tight seal is effected by means of an O-ring 13 between the piston 11 and member 12. A projection 14 on the upper part of the sliding seal member 7 extends into a groove 15 formed on the outside surface of the seal face bearing sliding ring element 12 and acts as a key to prevent relative rotational movement between the members 7 and 12. The cooperating seal face 16 of the member 12 abuts against seal face 17 which is fixedly located by pins 18 so that it is rotationally and axially fixed and does not rotate with the shaft 3.

The seal face 17, seal face carrying member 12 and piston portion 11 are spaced from the shaft 3 by annular passage 19, passage 20 leading to the annular space 21, and passage 22 leading to port 23 respectively while an annular passage 24 leads along the outside surface of the sliding seal member 7 to annular spaces 25 and 26.

FIGURE 1A shows the situation existing when a low pressure acts in the passages 19, 20 and 22 and annular spaces 21 and 23 and a high pressure acts externally of the seal components in the passage 24 and the annular spaces 25 and 26. The resultant effect of these pressures acting on the surfaces of the members 7, 11 and 12 with which they come in contact is that the seal face 16 is urged into contact with its co-operating seal face 17 and the sliding member is urged in a direction against the force exerted by the spring 10.

FIGURE 1B shows the situation existing when a high pressure exists in the passages 19, 20 and 22 and annular spaces 21 and 23 and a low pressure exists in the passage 24 and annular spaces 25 and 26. In this case the resultant effect of the high and low pressures acting on the surfaces of the components with which they come in contact is that the seal faces 16 and 17 are urged into sealing engagement as before but in this case the member 7 is not urged in a direction against the action of the spring 10 so that in this case there is no spring relief.

In an alternative embodiment of the invention as shown in FIGURES 2A and 2B the seal for a rotatable shaft 27 comprises a sliding seal member 28 mounted circumferentially on the shaft 27 and spring-loaded under the action of a coil spring 29 which abuts at its end remote from the member 28 against an axially fixed element 30 on which the member 28 is slidable and rendered gas-tight by an O-ring 31. Interlocking in sliding relationship with the member 28 is a separate intermediate annular axially slidable ring piston 32 having an O-ring 33 to make a gas-tight seal between the adjacent surfaces of the member 28 and ring piston 32. Engaging with that end 34 of diminished diameter of the ring 32 remote from the sliding seal member 28 is a seal face sliding member consisting of ring 35. A gas-tight seal between the end 34 and the member 35 is made by an O-ring 36. The seal face 37 of the member 35 abuts in sealing contact with a co-operating seal face 38 which is fixedly located by pins 39 so that it is rotationally and axially fixed relative to the shaft 27 and does not rotate therewith. An integral projection 40 on the member 28 extends into a groove 41 in the seal face member 35 so as to prevent relative angular movement therebetween. The seal face 38, seal face member 35 and piston 32 are spaced from the shaft 27 by annular passages 42, 43 leading to port 44 and passage 45 leading to port 46 respectively while an annular passage 47 leads along the outside surface of the member 28 to annular ports 38 and 49.

FIGURE 2A shows the situation existing when a high pressure is present in the passages 42, 43 and 45 and ports 44 and 46 and a low pressure is found in the passage 47 and the ports 48 and 49. The resultant effect of these pressures acting on the surfaces of the members 28, 32 and 35 with which they come in contact is that the seal face 37 is urged into contact with its co-operating seal face 38 and the sliding member 28 is urged in a direction against the force exerted by the spring 29. In this way the spring force acting to push the seal faces 37 and 38 together is relieved proportionally to the increase in pressure differential across the seal faces.

Similarly, FIGURE 2B shows the situation existing when a high pressure is present in the passage 47 and the ports 48 and 49 and a low pressure is present in the passages 42, 43 and 45 and port 44. The resultant effect of the pressures is the urging into contact of the seal faces 37 and 38 and the movement of sliding seal member 28 against the action of the spring 29 to provide spring relief.

It is well known in the art that by suitably disposing the area of the seal face 17 or 38 in the above embodiments in relation to the diameter of the seal face sliding member 12 or 35 respectively, the pressure force urging the two seal faces into contact may be varied as required for a particular configuration and a particular direction of pressure differences. Thus if the sliding seal diameter on which sliding of the seal face sliding member relative to the piston takes place were to coincide with the inner diameter of the seal face 17, the seal would be 100% unbalanced (0% balanced) with the higher pressure on the outer diameter of the seal faces and 0% unbalanced (100% balanced) with the higher pressure on the inner diameter of the seal faces. Further, if the diameter on which sliding of the seal face sliding member relative to the piston takes place, were to coincide with the outer diameter of the seal face 12 the seal would be 100% balanced (0% unbalanced) with the higher pressure on the outer diameter of the seal faces and 0% balanced (100% unbalanced) with the higher pressure on the inner diameter of the seal faces. In actual practice 70–80% unbalance (20–30% balance) is usual: a smaller unbalance (or greater balance) results in an unstable seal. Thus a particular seal with the normal degree of balance for a pressure differential in one direction is unable to cater for a pressure differential in the other direction. The present invention, however, enables a particular mechanical seal to have stable operation with a pressure differential in either direction.

It will therefore be seen that the mechanical seal described above, with reference to FIGURE 2, constitutes a partly balanced seal with spring load relief at the seal faces with pressure differential in either direction.

Modifications of the invention can be made to include for the provision of:

(1) Partly balanced seal operation for pressure differential in either direction with spring load relief at seal faces when lower pressure is on spring side only.

(2) Unbalanced seal operation with spring load relief at the seal faces for pressure differential in either direction.

(3) Unbalanced seal operation for pressure differential in either direction with spring load relief at the seal faces when higher pressure is on spring side only.

(4) Unbalanced seal operation for pressure differential in either direction with spring load relief at the seal faces when lower pressure is on spring side only.

The mechanical seal described above and the modifications 1 to 4 thereof constitute various forms of the invention where the sliding seal assembly is rotating with the shaft and where a single rotating spring is disposed substantially outside the sliding seal diameters. The invention is equally applicable, of course, to a seal having a single spring or a plurality of springs which may or may not rotate with the shaft and to designs where the spring means is substantially inside or outside the sliding seal diameters and to any combination thereof.

The feature of this invention common to all these various arrangements (i.e. the embodiments described with reference to the drawings, and modifications 1 to 4) is the differential piston incorporated in each seal system. In the invention's most comprehensive form the piston is a separate component, but in the less comprehensive form it is incorporated in the spring urged sliding seal member. The seal face sliding member 12 is angularly restrained relative to the spring urged sliding seal member by means of a lug or pin etc.

It will be apparent that if spring load relief at the seal faces is the only feature required of this invention on a given application and it is unnecessary to provide for seal operation for a pressure differential in both directions, then the sliding seal diameters—apart from that associated with the normal seal balance—can be suitably disposed to give spring load relief at the seal faces at any required value of pressure difference.

What I claim is:

1. In a mechanical seal for a rotatable shaft to be operated under variable fluid pressure conditions comprising a stationary annular member through which said rotating shaft extends and which presents a radial planar sealing face, a unit including an element fixed on said rotating shaft to rotate therewith, an axially slidable annular seal member extending around said shaft, and a spring between said element fixed on said shaft and said slidable seal member biasing said slidable seal member axially of said fixed element on said shaft and toward said stationary annular member, the improvement in which said seal member comprises at least two ring elements, a first of said ring elements presenting a cooperating annular radial planar sealing face in contact with said radial planar sealing face on said fixed annular member, and an opposing face axially spaced from said sealing face, the radial extent of said cooperating sealing face being greater than the radial extent of said sealing face on said fixed annular member, a second of said at least two ring elements being engaged by said spring and provided with a portion extending within said first ring element, the radial end of said second of said two ring elements exteriorly of said portion extending within said first ring element providing a face of an area greater than said opposing face of said first ring element, said second of said two ring elements being axially slidable but non-rotatably engaged with said first of said ring elements, annular sealing means between said first and second ring elements, and annular sealing means between said second ring element and said fixed element on said shaft whereby fluid under pressure between said first and second of said ring elements will operate more strongly against said second ring element than against said first ring element.

2. The mechanical seal of claim 1 in which the second of said ring elements is formed of two parts, an outer part engaged by said spring and engaging said annular sealing means between said second ring element and said element fixed on said rotating shaft, and an inner part telescoping with said outer part for axial movement and including the portion of said second of said ring elements extending within said first ring element, and a sealing element between said inner part and said outer part, said inner part having a shoulder to engage said first of said ring elements when moved toward said sealing surfaces, and said outer part being provided with a shoulder engageable with said inner part when it is moved toward said spring.

(References on following page)

References Cited
UNITED STATES PATENTS

| | | | |
|---|---|---|---|
| 3,072,414 | 1/1963 | Porges | 277—93 |
| 3,129,949 | 4/1964 | Laux | 277—27 |
| 3,144,253 | 8/1964 | Schmirmer | 277—27 |
| 3,179,422 | 4/1965 | Phillips | 277—27 X |

FOREIGN PATENTS

| | | |
|---|---|---|
| 766,390 | 1/1957 | Great Britain. |
| 623,605 | 8/1961 | Italy. |

LAVERNE D. GEIGER, *Primary Examiner.*

J. S. MEDNICK, *Assistant Examiner.*